United States Patent
Tokumoto et al.

(10) Patent No.: US 10,406,953 B2
(45) Date of Patent: Sep. 10, 2019

(54) VEHICLE SEAT

(71) Applicant: TS TECH CO., LTD., Asaka-shi, Saitama (JP)

(72) Inventors: Hideki Tokumoto, Reynoldsburg, OH (US); Jeff Finni, Reynoldsburg, OH (US); Jake Anderson, Reynoldsburg, OH (US); Katsuhiro Kiya, Reynoldsburg, OH (US)

(73) Assignee: TS Tech Co., Ltd., Saitama (JP)

( * ) Notice: Subject to any disclaimer, the term of this patent is extended or adjusted under 35 U.S.C. 154(b) by 228 days.

(21) Appl. No.: 15/471,015

(22) Filed: Mar. 28, 2017

(65) Prior Publication Data
US 2018/0281645 A1 Oct. 4, 2018

(51) Int. Cl.
*A47C 7/02* (2006.01)
*B60N 2/68* (2006.01)
*B60N 2/64* (2006.01)

(52) U.S. Cl.
CPC ............ *B60N 2/686* (2013.01); *B60N 2/64* (2013.01); *B60N 2/646* (2013.01); *B60N 2/688* (2013.01)

(58) Field of Classification Search
CPC .......... B60N 2/20; B60N 2/686; B60N 2/688; B60N 2/646; B62J 1/26; B62J 1/12
USPC ............. 297/452.18, 344.11, 378.12, 354.12
See application file for complete search history.

(56) References Cited

U.S. PATENT DOCUMENTS

| | | | | |
|---|---|---|---|---|
| 5,366,271 A * | 11/1994 | Johnston | ................ | B60N 2/286 297/250.1 |
| 6,908,151 B2 * | 6/2005 | Meeker | ................ | B60N 2/2806 297/250.1 |
| 6,975,737 B2 * | 12/2005 | Hirao | .................... | H04R 5/023 381/302 |
| 7,753,451 B2 * | 7/2010 | Maebert | ................ | B60N 2/686 297/344.11 |
| 9,756,408 B2 * | 9/2017 | Ferretti | .................. | H04R 1/023 |
| 10,035,442 B2 * | 7/2018 | Kondrad | ................ | B60N 2/829 |
| 10,052,990 B2 * | 8/2018 | Kondrad | ................ | B60N 2/809 |
| 2017/0066357 A1 * | 3/2017 | Ito | .......................... | A47C 31/02 |
| 2017/0355410 A1 * | 12/2017 | Yim | ........................... | B62J 1/08 |
| 2017/0368976 A1 * | 12/2017 | Matsushima | ............ | B60N 2/91 |
| 2018/0105085 A1 * | 4/2018 | Duncan | .................... | B60N 2/58 |
| 2018/0279791 A1 * | 10/2018 | Iwakata | ................ | A47C 7/746 |

FOREIGN PATENT DOCUMENTS

JP 2015-174529 A 10/2015

\* cited by examiner

*Primary Examiner* — Chi Q Nguyen
(74) *Attorney, Agent, or Firm* — Drinker Biddle & Reath LLP (57) ABSTRACT

An attachment of a surface cover to a seat back in a vehicle seat having through-holes is described. A bucket seat includes a pad provided with through-holes, a surface cover configured to cover a front surface of the pad, and a back frame disposed on a back side of the pad. The back frame includes: a support portion provided with through-holes, positioned to face the first through-holes, the support portion being configured to support the pad; and retaining portions provided around the through-holes and configured to retain hooks of the surface cover. The support portion and the retaining portions are integrally molded.

20 Claims, 10 Drawing Sheets

VEHICLE SEAT

BACKGROUND

The present disclosure relates to a vehicle seat configured such that a surface cover is attached to a seat back provided with through-holes.

Vehicles such as transportation vehicles, which include bucket seats having enhanced performance for fixation of occupants, have been known. Some of these bucket seats are configured such that through-holes for passage of a seat belt are formed at each seat back as described in, e.g., Japanese Patent Publication JP 2015-174529A.

In the case where the through-holes are formed at the seat back as in the above-described bucket seat, the shape of a peripheral portion of each of the through-holes is more complex, and for this reason, a surface cover is not easily attached to the seat back.

SUMMARY

The present disclosure has been made in view of the above-described problem, and the present disclosure describes embodiments of a vehicle seat configured such that attachment of a surface cover to a seat back provided with through-holes is facilitated.

A vehicle seat according to an embodiment includes a pad provided with a first through-hole, a surface cover configured to cover a front surface of the pad, and a back frame disposed on a back side of the pad. The back frame includes: a support portion having a second through-hole positioned to face the first through-hole, the support portion being configured to support the pad; and a retaining portion provided around the second through-hole and configured to retain an end portion of the surface cover. The support portion and the retaining portion are integrally molded with each other. According to the above-described vehicle seat, the retaining portion configured to retain the surface cover is formed around the through-hole of the back frame; therefore, the surface cover is easily retained at the periphery of the through-hole of the back frame. With this configuration, attachment of the surface cover to a seat back provided with a through-hole is facilitated.

Also, a vehicle seat according to another embodiment includes: a pad having a first through-hole; a surface cover configured to cover a front surface of the pad; a back frame having a second through-hole positioned to face the first through-hole, the back frame being disposed on a back side of the pad; and a frame portion provided on the surface cover to engage the back frame. The back frame includes a wall portion that forms an inner wall surface of the second through-hole and extends towards a front of the back frame, and a retaining portion provided around the second through-hole and configured to retain an end portion of the surface cover. An engaged portion engaged with the frame portion is formed at a portion of the wall portion which is thicker than the retaining portion. According to the above-described vehicle seat, the rigidity of the engaged portion of the back frame engaged with the frame portion can be improved. Further, according to the above-described vehicle seat, the retaining portion configured to retain the surface cover is formed around the through-hole of the back frame; therefore, the surface cover is easily retained at the periphery of the through-hole of the back frame. With this configuration, attachment of the surface cover to a seat back provided with a through-hole is facilitated.

Also, a vehicle seat according to still another embodiment includes: a pad having a first through-hole; a surface cover configured to cover a front surface of the pad; a back frame having a second through-hole positioned to face the first through-hole, the back frame being disposed on a back side of the pad; and a frame portion provided on the surface cover to engage the back frame. The back frame includes a wall portion that forms an inner wall surface of the second through-hole and extends towards a front of the back frame, and a retaining portion provided around the second through-hole and configured to retain an end portion of the surface cover. An inner wall surface of the wall portion includes a first inner peripheral surface disposed towards a front of the back frame and attached to the frame portion, and a second inner peripheral surface positioned towards a back of the back frame and inward of the first inner peripheral surface. An inner peripheral surface of the frame portion attached to the first inner peripheral surface of the wall portion and the second inner peripheral surface of the wall portion are connected together without difference in surface level. According to the above-described vehicle seat, the inner peripheral surface of the back frame and the inner peripheral surface of the frame portion can be connected together without difference in surface level in a state where the frame portion is attached to the back frame. Therefore, when being inserted through the through-hole of the seat back, the seat belt can be prevented from getting stuck in the through-hole. Moreover, the appearance of the seat back can be improved. In addition, according to the above-described vehicle seat, the retaining portion configured to retain the surface cover is formed around the through-hole of the back frame; therefore, the surface cover is easily retained at the periphery of the through-hole of the back frame. With this configuration, attachment of the surface cover to the seat back provided with the through-hole is facilitated.

In the above-described vehicle seat, the end portion of the surface cover may be retained at the retaining portion in a state where a tip end of the retaining portion is covered by the surface cover. Since the tip end of the retaining portion is covered by the surface cover as described above, the tip end of the retaining portion can be protected. Moreover, contact between the tip end of the retaining portion and an occupant can be prevented.

In the above-described vehicle seat, the retaining portion may protrude from the support portion towards a front of the back frame, and the retaining portion may be provided with a third through-hole. The end portion of the surface cover may be retained at the third through-hole. With this configuration, the surface cover can be retained at the back frame by a simple structure.

In the above-described vehicle seat, the retaining portion has a flange portion that extends in a direction away from the second through-hole. With this configuration, the rigidity of the retaining portion can be improved.

In the above-described vehicle seat, the back frame may include the wall portion that forms the inner wall surface of the second through-hole and extends towards a front of the back frame. The vehicle seat may further include the frame portion provided on the surface cover to engage the wall portion. The retaining portion may be covered by the frame portion. Since the retaining portion is covered by the frame portion as described above, the retaining portion can be protected. Moreover, contact between the retaining portion and an occupant can be prevented.

In the above-described vehicle seat, the back frame may be provided with a plurality of second through-holes, including the second through-hole, arranged side by side in a right-to-left direction, and the back frame may have a plurality of retaining portions, including the retaining portion, formed around the plurality of second through-holes to avoid a portion of the back frame between the plurality of second through-holes. The frame portion may cover the portion of the back frame between the plurality of second through-holes. With this configuration, the portion of the back frame between the plurality of through-holes provided at the back frame can be covered by the frame portion. Thus, the portion between the plurality of through-holes provided at the back frame does not need to be covered by the surface cover. Therefore, the area of the surface cover can be reduced.

In the above-described vehicle seat, the wall portion may comprise the engaged portion engaged with the frame portion. Since the frame portion is engaged with the wall portion provided at the back frame as described above, the through-holes provided at the back frame can be covered.

In the above-described vehicle seat, the engaged portion may be a through-hole of the wall portion into which a protruded portion formed at the frame portion is locked. With this configuration, engagement between the back frame and the frame portion can be established by a simple structure.

In the above-described vehicle seat, the wall portion may be provided with a recessed portion that is recessed towards a back of the back frame, and the frame portion may be engaged with the recessed portion. With this configuration, engagement between the back frame and the frame portion can be strengthened.

In the above-described vehicle seat, the wall portion may include the first inner peripheral surface disposed towards a front of the back frame and attached to the frame portion, and the second inner peripheral surface positioned towards a back of the back frame and inward of the first inner peripheral surface. The inner peripheral surface of the frame portion attached to the first inner peripheral surface of the wall portion and the second inner peripheral surface of the wall portion may be connected together without a difference in surface level. With this configuration, the inner peripheral surface of the back frame and the inner peripheral surface of the frame portion can be connected together without difference in surface level when the frame portion is attached to the back frame. Therefore, when being inserted through the through-hole of the seat back, the seat belt can be prevented from getting stuck in the through-hole. Moreover, the appearance of the seat back can be improved.

According to an embodiment, attachment of the surface cover to the seat back having the through-hole is facilitated. According to another embodiment, the rigidity of the engaged portion of the back frame engaged with the frame portion can be improved. According to still another embodiment, the inner peripheral surface of the back frame and the inner peripheral surface of the frame portion can be connected together without a difference in surface level. According to a further embodiment, when being inserted through the through-hole of the seat back, a member such as a seat belt can be prevented from getting stuck in the through-hole. According to a still further embodiment, the tip end of the retaining portion can be protected by the surface cover. According to another embodiment, the surface cover can be retained at the back frame by a simple structure. According to still another embodiment, the rigidity of the retaining portion can be improved. According to a further embodiment, the retaining portion can be protected by the frame portion. According to a still further embodiment, the area of the surface cover can be reduced. According to another embodiment, the through-holes provided at the back frame can be covered by the frame portion. According to still another embodiment, engagement between the back frame and the frame portion can be established by a simple structure. According to a further embodiment, engagement between the back frame and the frame portion can be strengthened.

DETAILED DESCRIPTION

An embodiment of a bucket seat 1 (an example of a vehicle seat) of the present disclosure is described below with reference to FIGS. 1 to 10. The bucket seat 1 is mounted as, e.g., a seat of an automobile such as a buggy car. The bucket seat 1 is set forth merely as an example for facilitating understanding of the present disclosure, and the bucket seat 1 does not limit the invention. That is, changes and modifications can be made to the shapes, dimensions, arrangements, etc. of members described below without departing from the scope of the invention. It will be understood that the invention may include equivalents thereof.

Directions such as a front-to-back direction, a right-to-left direction, and an upper-to-lower direction are hereinafter coincident with a corresponding direction as viewed from an occupant seated on the bucket seat 1. Moreover, a front surface hereinafter indicates a surface positioned forward (towards a front) of the bucket seat 1, and a back surface hereinafter indicates a surface positioned backward (towards a back) of the bucket seat 1.

Figure 1:
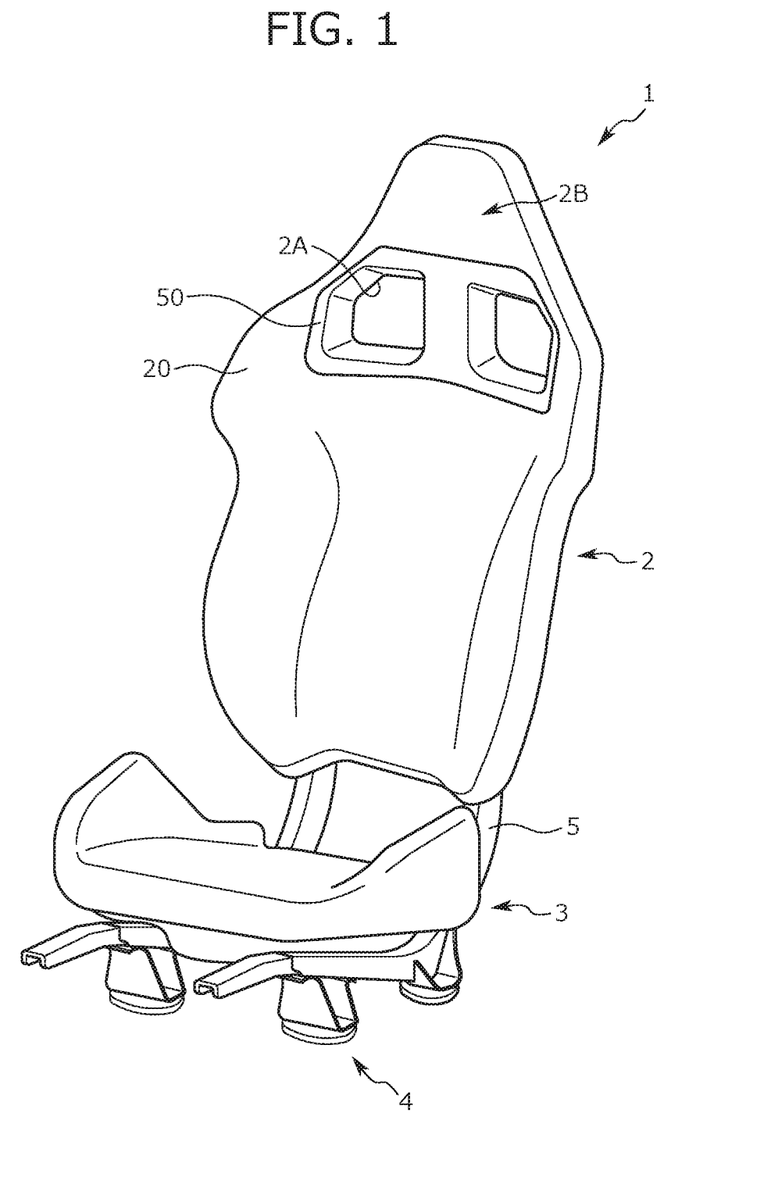
FIG. 1 is a perspective view of a bucket seat, according to an embodiment.

FIG. 1 is a perspective view of the bucket seat 1. As illustrated in FIG. 1, the bucket seat 1 includes a seat back 2 as a backrest, and a seat cushion 3 as a seating surface. The seat back 2 and the seat cushion 3 are attached to a metal frame 5. Chassis attachment portions 4 attached to a lower portion of the seat cushion 3 are configured to be fixed to a floor of a vehicle (not shown).

A front surface of the seat back 2 is covered by a surface cover 20. Moreover, two through-holes 2A arranged in the right-to-left direction are formed respectively at the positions of the seat back 2 above the shoulders of the occupant seated on the seat cushion 3. Each through-hole 2A is a hole through which a seat belt can be inserted from the back side of the seat back 2 to the front side of the seat back 2. Moreover, a frame portion 50 of the bucket seat 1 is fitted into the through-holes 2A. A portion of the seat back 2 above the frame portion 50 serves as a head rest 2B configured to support the head of the occupant seated on the seat cushion 3.

Figure 2:
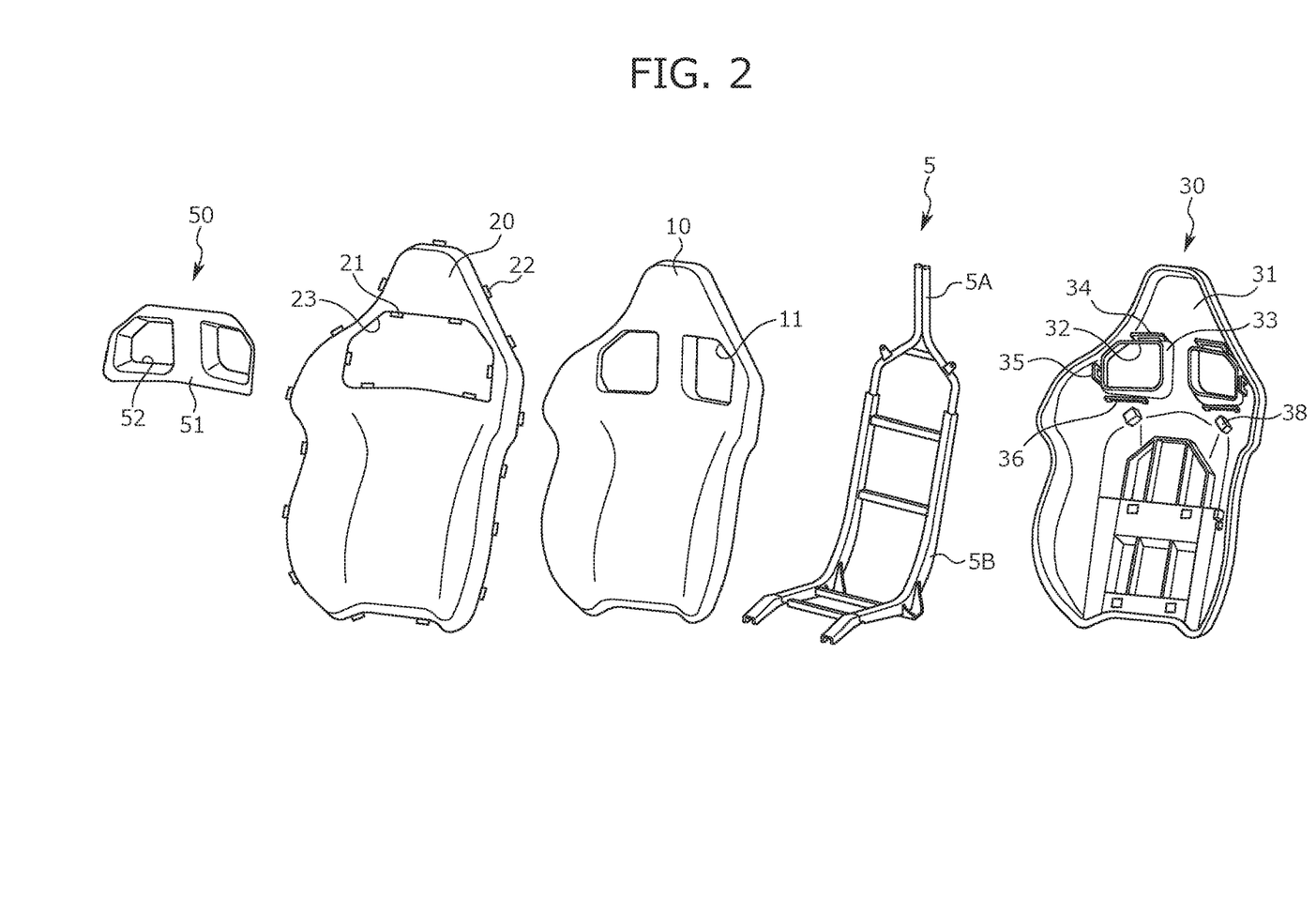
FIG. 2 is an exploded perspective view of a seat back, according to an embodiment.
Figure 3:
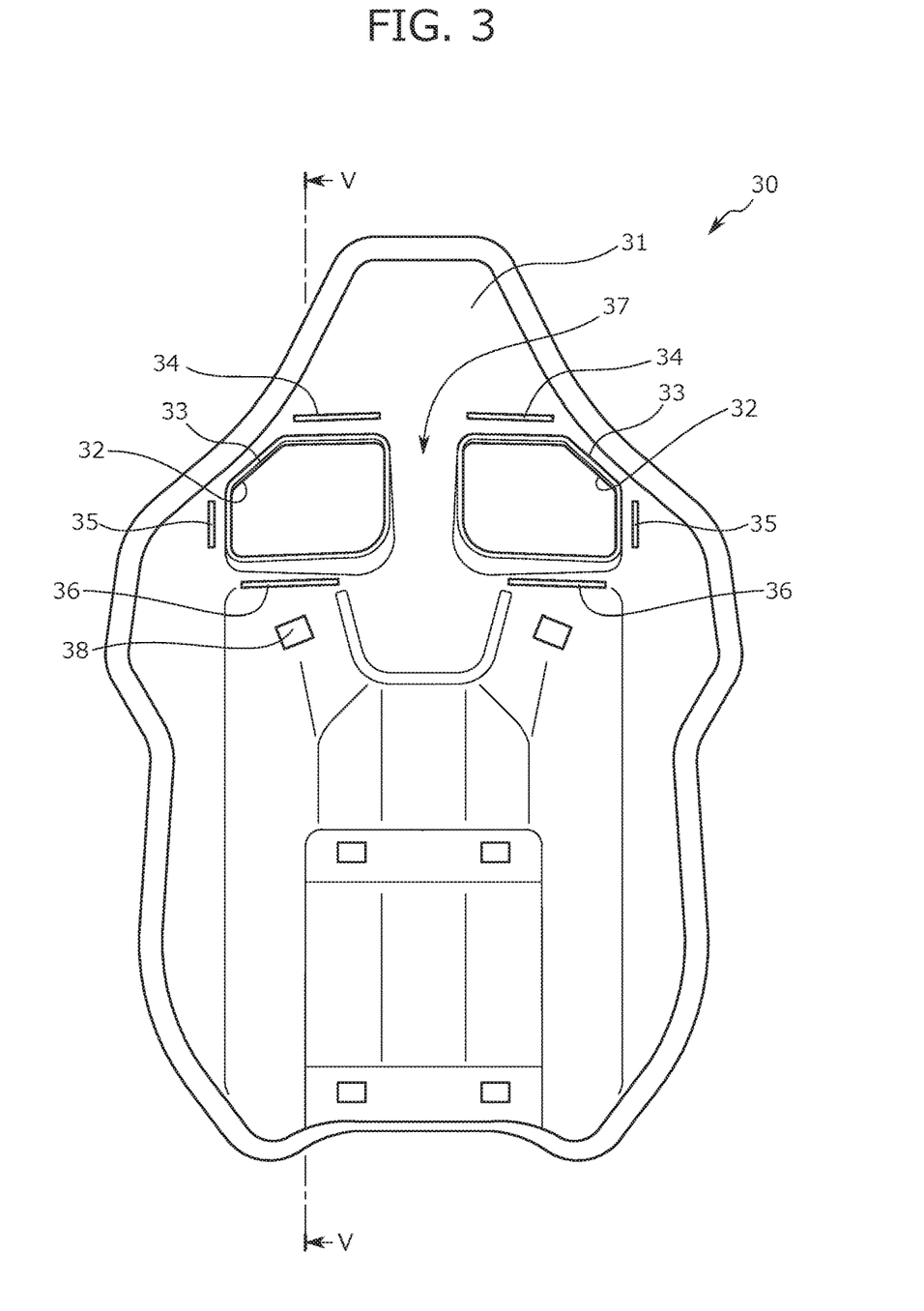
FIG. 3 is a front view of a back frame, according to an embodiment.
Figure 4:
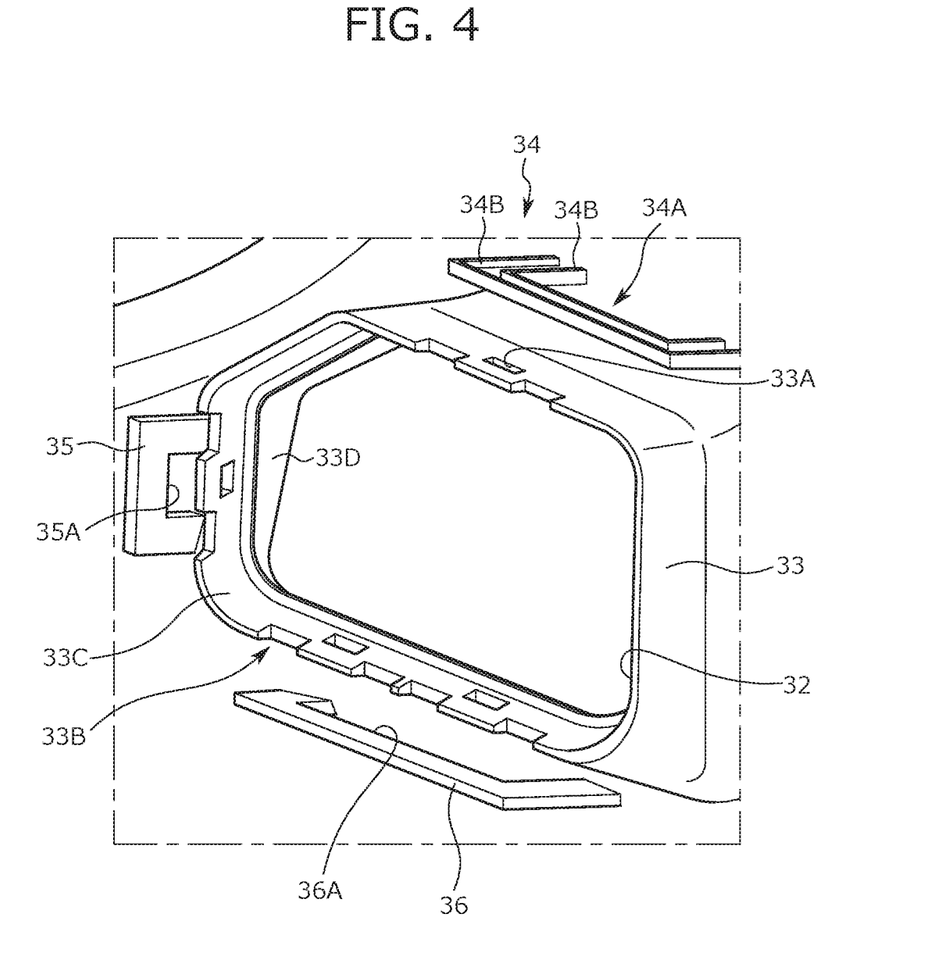
FIG. 4 is a partial, perspective, enlarged view of a periphery of a through-hole of the back frame, according to an embodiment.
Figure 5:
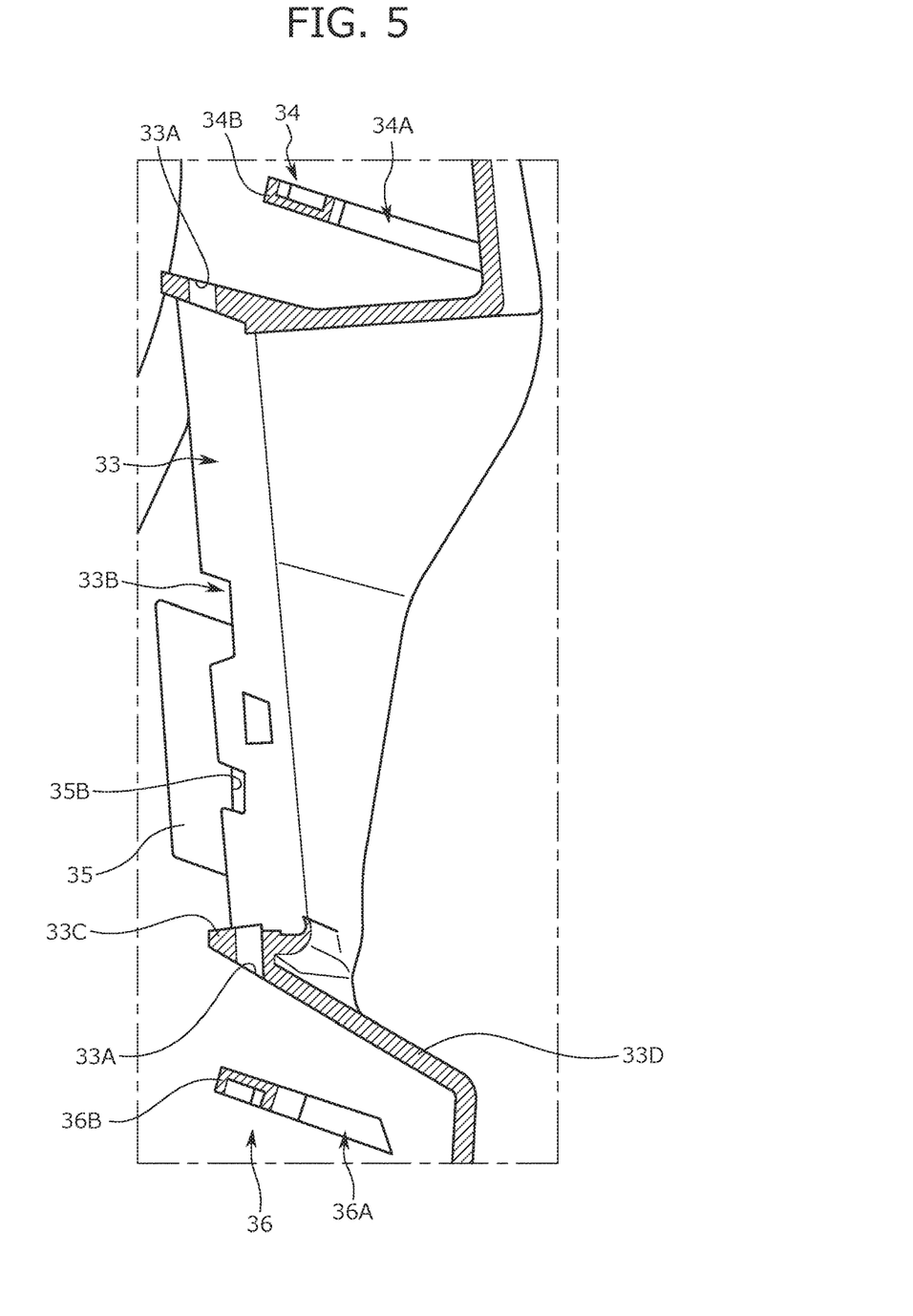
FIG. 5 is a cross-sectional view of the periphery of the through-hole of the back frame taken along the V-V line of FIG. 3, according to an embodiment.
Figure 6:
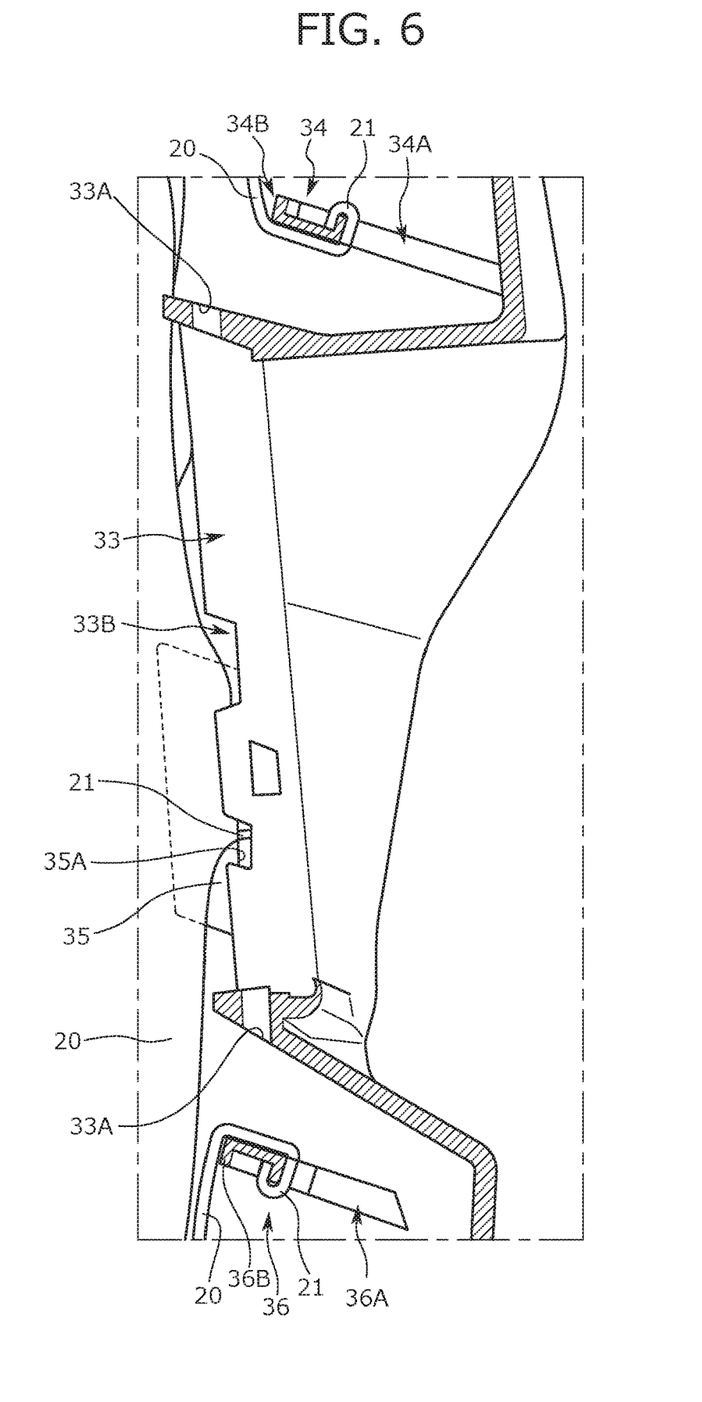
FIG. 6 is a view of an attachment state of a surface cover at the periphery of the through-hole of the back frame, according to an embodiment.
Figure 7:
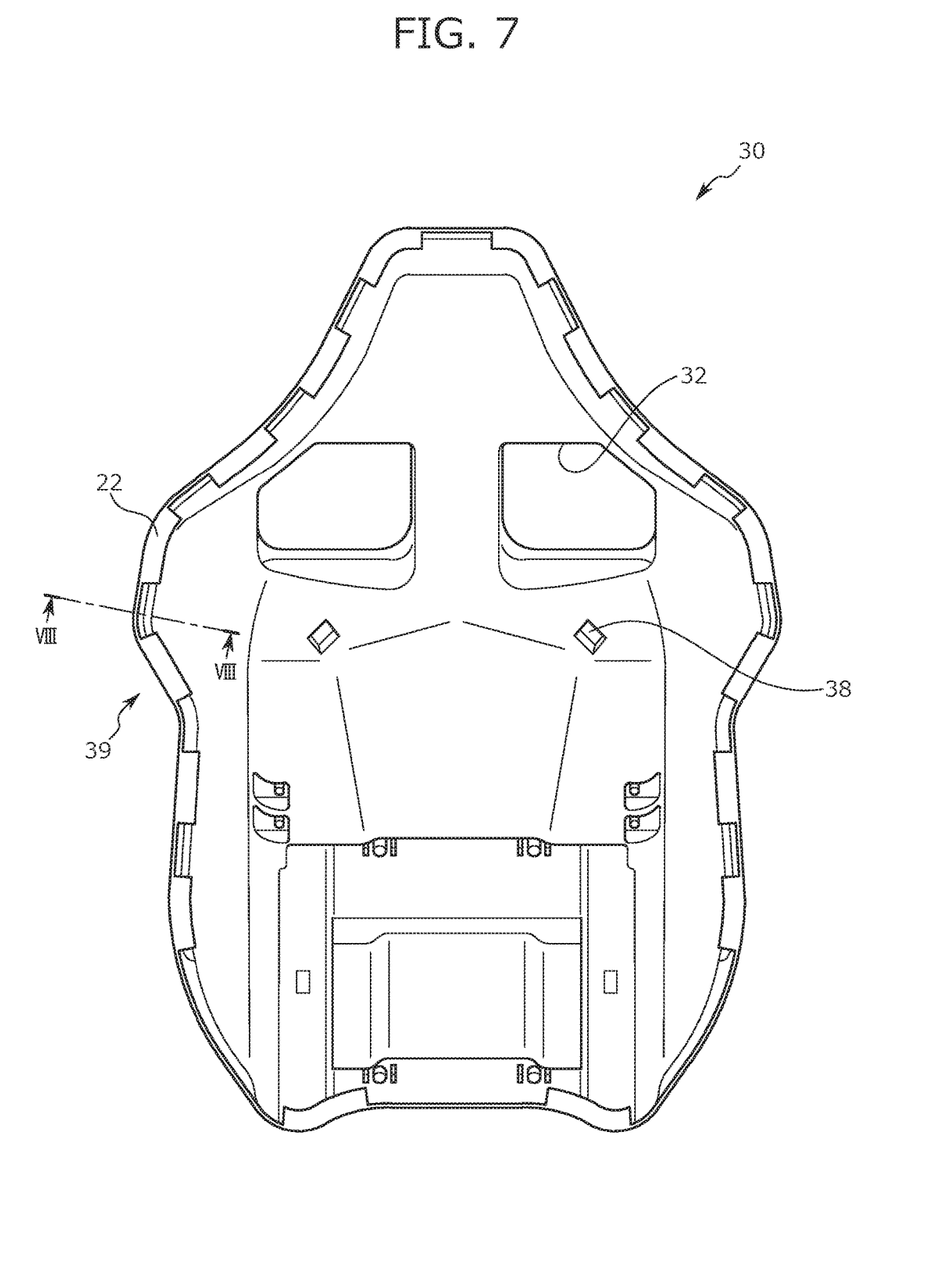
FIG. 7 is a back view of the back frame, according to an embodiment.
Figure 8:
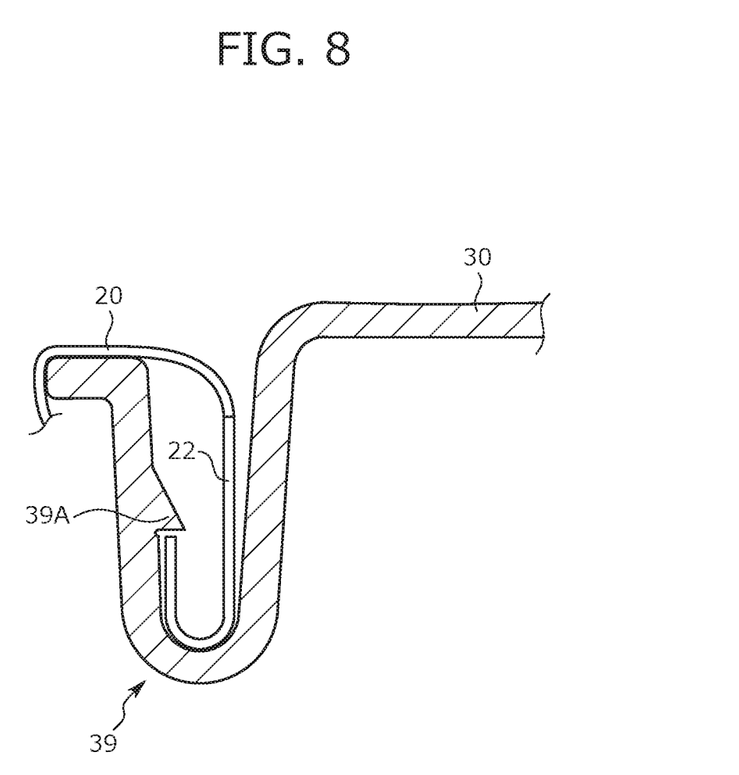
FIG. 8 is a cross-sectional view of the back frame taken along the VIII-VIII line of FIG. 7, according to an embodiment.
Figure 9:
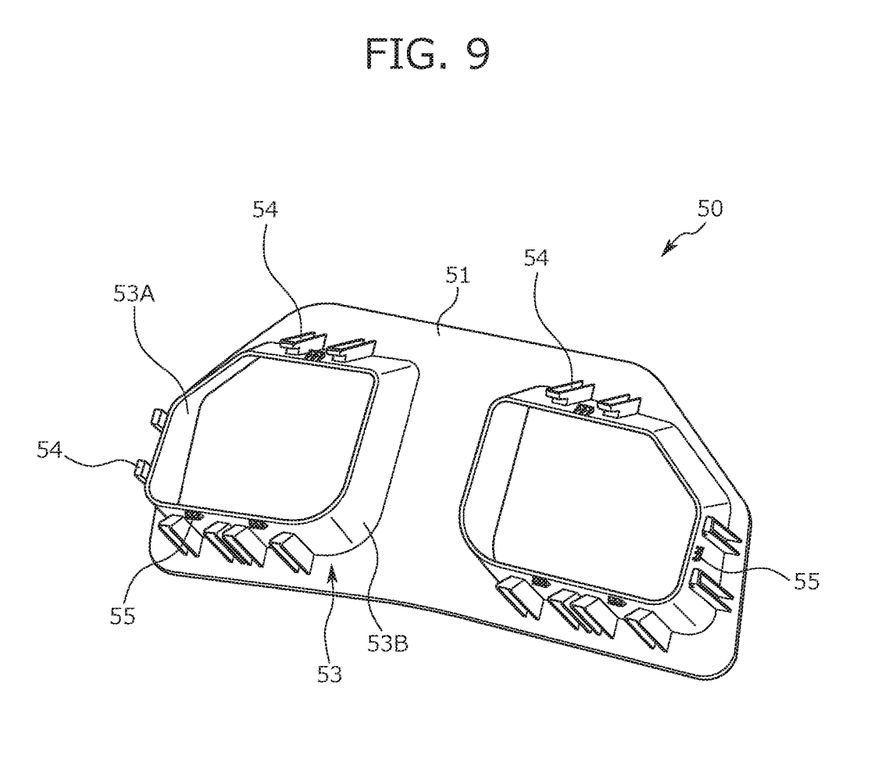
FIG. 9 is a perspective view of a back surface of a frame portion, according to an embodiment.
Figure 10:
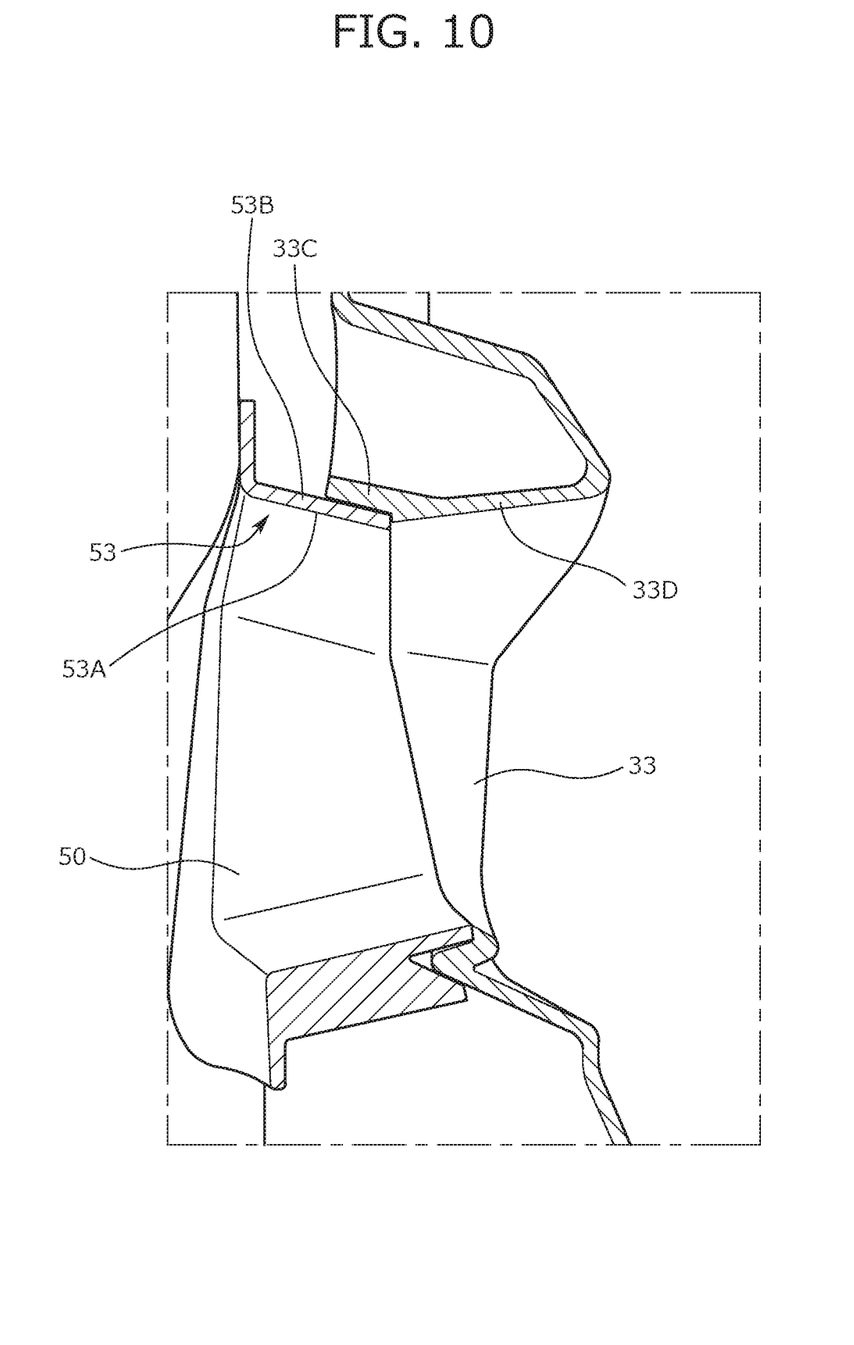
FIG. 10 is a cross-sectional view of an engagement state between the frame portion and a wall portion of the back frame, according to an embodiment.

A configuration of the seat back 2 provided at the bucket seat 1 is described in detail below with reference to FIGS. 2 to 10. A summary of each of FIGS. 2 to 10 is as follows. FIG. 2 is an exploded perspective view of the seat back 2, according to an embodiment. FIG. 3 is a front view of a back frame 30, according to an embodiment. FIG. 4 is a partial, perspective, enlarged view of a periphery of each through-hole 32 of the back frame 30, according to an embodiment. FIG. 5 is a cross-sectional view of the periphery of each through-hole 32 of the back frame 30 taken along the V-V line of FIG. 3, according to an embodiment. FIG. 6 is a view of an attachment state of the surface cover 20 at the periphery of each through-hole 32 of the back frame 30, according to an embodiment. FIG. 7 is a back view of the back frame 30, according to an embodiment. FIG. 8 is a cross-sectional view of a periphery of an edge portion 39 of the back frame 30 taken along a VIII-VIII line of FIG. 7, according to an embodiment. FIG. 9 is a perspective view of a configuration of a back surface of the frame portion 50, according to an embodiment. FIG. 10 is a cross-sectional view of an engagement state between the frame portion 50 and each wall portion 33 of the back frame 30, according to an embodiment.

As illustrated in FIG. 2, the seat back 2 mainly includes the back frame 30, the metal frame 5, a pad 10, the surface cover 20, and the frame portion 50.

The step of assembling the seat back 2 is herein briefly described. First, the metal frame 5 is positioned such that an upper frame 5A including pipes forming the metal frame 5 is disposed to conform to raised portions 38 that are formed at the back frame 30 to protrude towards a front of the seat. Then, the back frame 30 is fixed to the upper frame 5A. The metal frame 5 includes the upper frame 5A and a lower frame 5B, and the seat cushion 3 is attached to the lower frame 5B.

Next, the pad 10 is placed on a front surface of the back frame 30. Specifically, the pad 10 is placed such that the wall portions 33 of the back frame 30 are inserted into respective through-holes 11 (first through-holes) formed in the pad 10 and such that a back surface of the pad 10 is supported by a support portion 31 of the back frame 30.

Next, the surface cover 20 is attached to the back frame 30 to cover the pad 10. Specifically, hooks 21 provided at the periphery of a through-hole 23 of the surface cover 20 are hooked respectively on retaining portions 34, 35, 36 provided at the periphery of each wall portion 33 of the back frame 30. Moreover, as illustrated in FIGS. 7 and 8, hooks 22 provided at an outer edge portion of the surface cover 20 are hooked on the back side of the edge portion 39 of the back frame 30. More specifically, the edge portion 39 of the back frame 30 is formed in a U-shape as illustrated in FIGS. 7 and 8. An inner surface of the U-shaped portion of the edge portion 39 has lock portions 39A protruding inward of the seat. A tip end of each hook 22 of the surface cover 20 is locked at a corresponding one of the lock portions 39A of the edge portion 39; thereby, the hook 22 is retained at the back frame 30.

The wall portions 33 of the back frame 30 are fitted into the frame portion 50 through the through-hole 23 of the surface cover 20 and the through-holes 11 of the pad 10.

Configurations of the back frame 30 and the frame portion 50 are mainly described in detail below.

The back frame 30 is a shell-shaped resin frame. The back frame 30 is in such a curved shape that the back frame 30 matches the upper body of the seated occupant.

As illustrated in FIG. 3, the back frame 30 includes the support portion 31 configured to support the pad 10. The two through-holes 32 (second through-holes) are formed in the support portion 31 to be located side by side in the right-to-left direction. In the back frame 30, each cylindrical wall portion 33 forming an inner wall surface of the second through-hole and protruding towards a front of the back frame 30 from the support portion 31 is formed at the periphery of a corresponding one of the through-holes 32.

The configuration for retaining the surface cover 20 on the back frame 30 is herein described in detail with reference to FIGS. 2 to 6.

As illustrated in FIGS. 3 and 4, the retaining portions 34, the retaining portions 35, and the retaining portions 36 are formed at the periphery of the support portion 31 by integral molding therewith to be respectively located on the upper side of the wall portion 33, on the lateral outer side of the seat, and on the lower side of the wall portion 33. The retaining portions 34, 35, 36 are portions at which the corresponding hooks 21 provided at the periphery of the through-hole 23 of the surface cover 20 are respectively retained.

As illustrated in FIGS. 4 and 5, each retaining portion 34 is an inverted U-shaped portion protruding towards a front of the seat from the support portion 31, and a through-hole 34A (third through-hole) is formed at the center of the retaining portion 34. Flange portions 34B protruding in a direction away from the through-hole 32 of the back frame 30 (in this case, protruding upward) are formed respectively at inner and outer peripheral portions of the retaining portion 34. Since each retaining portion 34 is provided as described above, the strength of the retaining portion 34 can be improved.

Each retaining portion 35 is an inverted U-shaped portion protruding towards a front of the seat from the support portion 31, and a through-hole 35A (third through-hole) is formed at the center of the retaining portion 35. Moreover, each retaining portion 36 is an inverted U-shaped portion protruding towards a front of the seat from the support portion 31, and a through-hole 36A is formed at the center of the retaining portion 36. Flange portions protruding in directions away from the through-hole 32 of the back frame 30 are formed respectively at inner and outer peripheral portions of each of the retaining portions 35, 36 in the same way as in the retaining portion 34.

FIG. 6 illustrates the state in which the surface cover 20 is retained at the retaining portions 34, 35, 36. As illustrated in FIG. 6, the hook 21 of the surface cover 20 is inserted in the through-hole 34A of the retaining portion 34 to be retained at the inner peripheral portion of the retaining portion 34. In the state in which the hook 21 of the surface cover 20 is retained at the retaining portion 34, a tip end of the retaining portion 34 is covered by the surface cover 20.

Also, the hook 21 of the surface cover 20 is inserted in the through-hole 35A of the retaining portion 35 to be retained at the inner peripheral portion of the retaining portion 35. In the state in which the hook 21 of the surface cover 20 is retained at the retaining portion 35, a tip end of the retaining portion 35 is covered by the surface cover 20.

Similarly, the hook 21 of the surface cover 20 is inserted in the through-hole 36A of the retaining portion 36 to be retained at the inner peripheral portion of the retaining portion 36. In the state in which the hook 21 of the surface cover 20 is retained at the retaining portion 36, a tip end of the retaining portion 36 is covered by the surface cover 20.

Next, a configuration of a portion of the back frame 30, which is engaged with the frame portion 50, is mainly described with reference to FIGS. 4 and 5.

As illustrated in FIG. 4, a step is formed on an inner peripheral surface (inner wall surface) of the wall portion 33. A portion of the inner peripheral surface of the wall portion 33 positioned on the front side of the seat with respect to the step is herein defined as a first inner peripheral surface 33C. In addition, a portion of the inner peripheral surface of the wall portion 33 positioned on the back side of the seat with respect to the step and raised from the first inner peripheral surface 33C toward the center of the through-hole 32 is herein defined as a second inner peripheral surface 33D.

As illustrated in FIGS. 4 and 5, the first inner peripheral surface 33C has through-holes 33A (engaged portions) extending from the inner side towards the outer side of the seat. Recessed portions 33B (engaged portions) are formed in a front end portion of the wall portion 33 to be located at the periphery of the through-holes 33A. Here, each of the recessed portions 33B is formed in a shape recessed towards the back of the seat.

The through-holes 33A and the recessed portions 33B are engaged portions to be engaged with the frame portion 50. As illustrated in FIG. 5, a portion of the wall portion 33 in which each of the through-holes 33A is formed is thicker than the retaining portion 34. As just described, the through-hole 33A is formed to be thick; therefore, the strength of the portion of the wall portion 33 to be engaged with the frame portion 50 is further increased compared with other portions.

Next, the configuration of the frame portion 50 is described with reference to FIGS. 2 and 9. As illustrated in FIG. 2, the frame portion 50 includes a cover portion 51 provided with through-holes 52. The cover portion 51 is configured to cover the through-hole 23 of the surface cover 20.

As illustrated in FIG. 9, cylindrical wall portions 53 protruding backward from the cover portion 51 are formed on the back surface of the frame portion 50 at the periphery of the respective through-holes 52.

First engagement portions 54 and second engagement portions 55 are formed at an outer peripheral portion of each of the wall portions 53. Each of the first engagement portions 54 is a claw portion to be engaged with a corresponding one of the through-holes 33A of the wall portion 33 of the back frame 30. Each of the second engagement portions 55 is a protruded portion to be engaged with a corresponding one of the recessed portions 33B of the wall portion 33 of the back frame 30.

FIG. 10 illustrates an engagement state in which the frame portion 50 is engaged with the back frame 30. The engagement state in which the frame portion 50 is engaged with the back frame 30 corresponds to the state in which each first engagement portion 54 of the frame portion 50 is engaged with a corresponding one of the through-holes 33A of the back frame 30 and each second engagement portion 55 of the frame portion 50 is engaged with a corresponding one of the recessed portions 33B of the back frame 30. In the above-described engagement state, an outer peripheral surface 53B of the frame portion 50 is in contact with the first inner peripheral surface 33C of the wall portion 33 as illustrated in FIG. 10. Moreover, in the above-described engagement state, an inner peripheral surface 53A of the frame portion 50 is positioned adjacent to the second inner peripheral surface 33D of the back frame 30 at a connected portion between the frame portion 50 and the back frame 30. Therefore, the inner peripheral surface 53A of the frame portion 50 forming an inner peripheral surface of the through-hole 2A of the seat back 2 and the second inner peripheral surface 33D of the back frame 30 are smoothly connected together. Consequently, the seat belt to be inserted in the through-hole 2A of the seat back 2 can be prevented from getting stuck in the inner peripheral surface of the through-hole 2A. As a result, the through-hole 2A of the seat back 2 can be more aesthetically pleasing.

Moreover, in the engagement state in which the frame portion 50 is engaged with the back frame 30, a middle portion 37 located between the right and left through-holes 32 of the back frame 30 is covered by the cover portion 51 of the frame portion 50 as illustrated in FIGS. 1 to 3. With this configuration, it is not necessary to attach the surface cover 20 to the middle portion 37 of the back frame 30; therefore, the area of the surface cover 20 can be reduced.

In the bucket seat 1 described above, the retaining portions 34, 35, 36 via which the hooks 21 of the surface cover 20 are retained around each of the through-holes 32 of the back frame 30 are integrally molded with the back frame 30; therefore, the surface cover 20 is easily retained around the through-hole 32 of the back frame 30. With this configuration, the surface cover 20 is easily attached on the front surface of the seat back 2 provided with the through-holes 2A.

Also, in the bucket seat 1, the hooks 21 of the surface cover 20 are retained at the retaining portions 34, 35, 36 with front end portions of the respective retaining portions 34, 35, 36 covered by the surface cover 20. With this configuration, the front end portions of the respective retaining portions 34, 35, 36 can be protected by the surface cover 20. Accordingly, contact between the front end portions of the retaining portions and an occupant can be inhibited.

Further, in the bucket seat 1, each of the retaining portions 34, 35, 36 is simply structured to have a substantially U-shape; therefore, the retaining portions 34, 35, 36 are easily integrally molded with the back frame 30.

Furthermore, in the bucket seat 1, the flange portions 34B are formed at the retaining portion 34; therefore, the rigidity of the retaining portion 34 can be improved. Likewise, flange portions are formed at each of the retaining portions 35, 36; thereby, the rigidity thereof is improved.

Moreover, in the bucket seat 1, the retaining portions 34, 35, 36 are covered by the frame portion 50 and therefore can be protected. In addition, contact between the retaining portions 34, 35, 36 and an occupant can be inhibited.

Also, in the bucket seat 1, the middle portion 37 located between the plural through-holes 32 provided in the back frame 30 is covered by the frame portion 50. With this configuration, the middle portion 37 located between the plural through-holes 32 provided in the back frame 30 does not need to be covered by the surface cover 20. Thus, the area of the surface cover 20 can be reduced.

Further, in the bucket seat 1, the recessed portions 33B formed in each of the wall portions 33 of the back frame 30 are engaged with the corresponding first engagement portions 54 formed at the frame portion 50, and the through-holes 33A formed in each of the wall portions 33 of the back frame 30 are engaged with the corresponding second engagement portions 55 formed at the frame portion 50.

With this configuration, engagement between the back frame 30 and the frame portion 50 can be established by a simple structure.

Furthermore, in the bucket seat 1, the inner peripheral surface 53A of the back frame 30 and the second inner peripheral surface 33D of the frame portion 50 can be connected together without a difference in surface level (e.g., a flush engagement) in the engagement state where the frame portion 50 is attached to the back frame 30. With this configuration, when being inserted through the through-hole 2A of the seat back 2, the seat belt can be prevented from getting stuck in the through-hole 2A. In addition, the appearance of the seat back 2 can be improved.

In addition, in the bucket seat 1, the through-hole 33A of the back frame 30 to be engaged with the frame portion 50 is formed thicker than a retaining portion such as the retaining portion 34 at which the surface cover 20 is retained. With this configuration, the rigidity of a portion of the back frame 30 to be engaged with the frame portion 50 can be improved.

The invention is not limited to the above-described embodiment. In the above-described embodiment, an example where the invention is applied to the seat of the automobile is described, but not limited thereto. Alternatively, the invention may be applied to various vehicles such as airplanes, ships, space ships, and roller coasters.

What is claimed is:

1. A vehicle seat comprising:
   a pad having a first through-hole;
   a surface cover configured to cover a front surface of the pad; and
   a back frame disposed on a back side of the pad;
   wherein the back frame includes:
      a support portion having a second through-hole positioned to face the first through-hole, the support portion being configured to support the pad; and
      a retaining portion provided around the second through-hole and configured to retain an end portion of the surface cover; and
   wherein:
      the retaining portion protrudes from the support portion towards a front of the back frame;
      the retaining portion has a third through-hole; and
      the end portion of the surface cover is retained in the third through-hole.

2. The vehicle seat according to claim 1, wherein the end portion of the surface cover is retained at the retaining portion in a state where a tip end of the retaining portion is covered by the surface cover.

3. The vehicle seat according to claim 1, wherein the retaining portion has a flange portion that extends in a direction away from the second through-hole.

4. A vehicle seat comprising:
   a pad having a first through-hole;
   a surface cover configured to cover a front surface of the pad; and
   a back frame disposed on a back side of the pad;
   wherein the back frame includes:
      a support portion having a second through-hole positioned to face the first through-hole, the support portion being configured to support the pad; and
      a retaining portion provided around the second through-hole and configured to retain an end portion of the surface cover;
   wherein:
      the back frame includes a wall portion that forms an inner wall surface of the second through-hole and extends towards a front of the back frame;
      the vehicle seat further comprises a frame portion provided on the surface cover to engage the wall portion; and
      the retaining portion is covered by the frame portion.

5. The vehicle seat according to claim 4, wherein:
   the back frame has a plurality of second through-holes, including the second through-hole, arranged side by side in a right-to-left direction;
   the back frame has a plurality of retaining portions, including the retaining portion, formed around the plurality of second through-holes to avoid a portion of the back frame between the plurality of second through-holes; and
   the frame portion covers the portion of the back frame between the plurality of second through-holes.

6. The vehicle seat according to claim 4, wherein the wall portion comprises an engaged portion engaged with the frame portion.

7. The vehicle seat according to claim 6, wherein the engaged portion is a through-hole of the wall portion into which a protruded portion of the frame portion is locked.

8. The vehicle seat according to claim 7, wherein:
   the wall portion has a recessed portion that is recessed towards a back of the back frame; and
   the frame portion is engaged with the recessed portion.

9. The vehicle seat according to claim 4, wherein:
   the wall portion includes:
      a first inner peripheral surface disposed towards a front of the back frame and attached to the frame portion; and
      a second inner peripheral surface positioned towards a back of the back frame and inward of the first inner peripheral surface; and
   an inner peripheral surface of the frame portion attached to the first inner peripheral surface of the wall portion and the second inner peripheral surface of the wall portion are connected together without a difference in surface level.

10. The vehicle seat according to claim 4, wherein:
    an engaged portion engaged with the frame portion is formed at a portion of the wall portion which is thicker than the retaining portion.

11. The vehicle seat according to claim 1, further comprising:
    a frame portion provided on the surface cover to engage the back frame;
    wherein:
       the back frame includes a wall portion that forms an inner wall surface of the second through-hole and extends towards a front of the back frame; and
       an engaged portion engaged with the frame portion is formed at a portion of the wall portion which is thicker than the retaining portion.

12. The vehicle seat according to claim 11, wherein:
    the back frame has a plurality of second through-holes, including the second through-hole, arranged side by side in a right-to-left direction;
    the back frame has a plurality of retaining portions, including the retaining portion, formed around the plurality of second through-holes to avoid a portion of the back frame between the plurality of second through-holes; and
    the frame portion covers the portion between the plurality of second through-holes.

13. The vehicle seat according to claim 11, wherein the wall portion comprises the engaged portion engaged with the frame portion.

14. The vehicle seat according to claim 13, wherein the engaged portion is a through-hole of the wall portion into which a protruded portion of the frame portion is locked.

15. The vehicle seat according to claim 14, wherein:
the wall portion has a recessed portion that is recessed towards a back of the back frame; and
the frame portion is engaged with the recessed portion.

16. A vehicle seat comprising:
a pad having a first through-hole;
a surface cover configured to cover a front surface of the pad;
a back frame having a second through-hole positioned to face the first through-hole, the back frame being disposed on a back side of the pad; and
a frame portion provided on the surface cover to engage the back frame;
wherein the back frame includes:
　a wall portion that forms an inner wall surface of the second through-hole and extends towards a front of the back frame; and
　a retaining portion provided around the second through-hole and configured to retain an end portion of the surface cover;
wherein an inner wall surface of the wall portion includes:
　a first inner peripheral surface disposed towards a front of the back frame and attached to the frame portion; and
　a second inner peripheral surface positioned towards a back of the back frame and inward of the first inner peripheral surface; and
wherein an inner peripheral surface of the frame portion attached to the first inner peripheral surface of the wall portion and the second inner peripheral surface of the wall portion are connected together without a difference in surface level.

17. The vehicle seat according to claim 16, wherein:
the back frame has a plurality of second through-holes, including the second through-hole, arranged side by side in a right-to-left direction;
the back frame has a plurality of retaining portions, including the retaining portion, formed around the plurality of second through-holes to avoid a portion of the back frame between the plurality of second through-holes; and
the frame portion covers the portion of the back frame between the plurality of second through-holes.

18. The vehicle seat according to claim 16, wherein the wall portion comprises an engaged portion engaged with the frame portion.

19. The vehicle seat according to claim 18, wherein the engaged portion is a through-hole of the wall portion into which a protruded portion of the frame portion is locked.

20. The vehicle seat according to claim 19, wherein:
the wall portion has a recessed portion that is recessed towards a back of the back frame; and
the frame portion is engaged with the recessed portion.

* * * * *